United States Patent
Joshi et al.

(10) Patent No.: US 6,431,467 B1
(45) Date of Patent: *Aug. 13, 2002

(54) LOW FIRING RATE OXY-FUEL BURNER

(75) Inventors: Mahendra L. Joshi, Darien, IL (US); Donald J. Fournier, Jr., Hattiesburg, MS (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/479,071

(22) Filed: Jan. 7, 2000

Related U.S. Application Data

(63) Continuation of application No. 09/019,475, filed on Feb. 5, 1998, now Pat. No. 6,029,910.

(51) Int. Cl.$^7$ ................................................. B05B 7/10
(52) U.S. Cl. ...................... 239/404; 239/405; 239/406; 239/424
(58) Field of Search ............................. 239/403–406, 239/417.3, 423, 424, 416.5

(56) References Cited

U.S. PATENT DOCUMENTS

| | | | |
|---|---|---|---|
| 1,398,650 A | * 11/1921 | Rothwell | 239/404 |
| 1,513,624 A | * 10/1924 | Parker | 239/404 |
| 1,547,669 A | 7/1925 | Powell | 239/487 X |
| 1,684,488 A | 9/1928 | Haeusser et al. | 239/404 X |
| 1,860,347 A | 5/1932 | Crowe | 239/487 |
| 2,316,887 A | * 4/1943 | Pate et al. | |
| 2,324,147 A | * 7/1943 | Gendron | 239/487 |
| 2,804,338 A | 8/1957 | Johnston | 239/487 X |
| 3,076,607 A | * 2/1963 | Cordier | 239/404 |
| 3,638,865 A | * 2/1972 | McEnoy et al. | 239/424 |
| 4,014,469 A | * 3/1977 | Sato | |
| 4,552,579 A | 11/1985 | Blumenfeld | |
| 4,662,927 A | 5/1987 | Blumenfeld | |
| 4,708,728 A | 11/1987 | Desprez et al. | |
| 5,143,293 A | * 9/1992 | Pairis | |
| 5,169,424 A | 12/1992 | Grinnen et al. | |
| 5,199,866 A | 4/1993 | Joshi et al. | |
| 5,256,058 A | 10/1993 | Slavejkov et al. | |
| 5,405,082 A | 4/1995 | Brown et al. | |
| 5,500,030 A | 3/1996 | Joshi et al. | |
| 6,029,910 A | * 2/2000 | Joshi et al. | 239/404 |

FOREIGN PATENT DOCUMENTS

| | | | |
|---|---|---|---|
| DE | 1150840 | 6/1963 | |
| IT | 452288 | 4/1949 | 239/404 |

* cited by examiner

Primary Examiner—Lesley D. Morris
Assistant Examiner—Christopher Kim
(74) Attorney, Agent, or Firm—Linda K. Russell

(57) ABSTRACT

A low firing rate oxy-fuel burner which may be comprised of commercially available standard components and which includes an oxidant conduit and a fuel conduit within the oxidant conduit. The fuel conduit has a fuel nozzle at the forward end thereof with a fuel swirler in the form of a twist drill positioned therein which is maintained in a an aerodynamically centered position by the flowing fuel stream. The oxidant conduit has an oxidant nozzle at the forward end thereof with an oxidant swirler in the form of helical spring position therein and surrounding the fuel nozzle.

4 Claims, 4 Drawing Sheets

LOW FIRING RATE OXY-FUEL BURNER

This application is a continuation of application Ser. No. 09/019,475, filed Feb. 5, 1998 U.S. Pat No. 6,029,910.

BACKGROUND OF THE INVENTION

1. Field of the Invention

This invention relates generally to a low firing rate oxy-fuel burner. More particularly, this invention relates to a low firing rate oxy-fuel burner for use in such low firing rate applications as small reactors, retorts, crucibles, furnaces, molten glass distribution systems, feeders and refiners.

2. Background

Low firing rate burners (up to about 1,000,000 Btu/Hr) are useful in many types of heating applications. One particularly beneficial use of such burners is in molten glass distribution systems such as glass furnace forehearths.

In the production of glass objects, molten glass is produced in a glass melting furnace in which the raw materials for making glass are melted. The molten glass is passed from the glass melting furnace through a glass distribution system to the processing section or feeder for a forming machine in which the molten glass is processed into the desired glass shape or article.

The glass distribution system may include distribution channels, feeders and forehearths. Typical forehearths are designed to receive molten glass from the furnace and convey it to the glass processing section or machine and condition the glass as it is conveyed therethrough so that the glass is suitable for processing. Forehearths may generally include a refractory trough along which the molten glass flows and which is covered with an insulating roof.

A forehearth may also include two sections, a cooling section for receiving the molten glass and an equalizing section from which the molten glass exits into the processing section or feeder. The cooling section serves to cool or heat the molten glass to the required temperature for processing. However, it is known that the temperature of the glass is not homogeneous throughout its cross-section during travel through the cooling section. The glass tends to be cooler at the outside edges and hotter in the central portion due to the cooling effect of the side wall of the channel. For this reason, heating means such as gas burners are provided in the side of the cooling section to heat the glass. Cooling air may also be blown into the cooling section of the forehearth above the molten glass to cool the glass particularly in the central portion. By adjusting the rates of heating and cooling, homogeneity of the glass temperature throughout the cross section of the glass in the cooling section of the forehearth can be improved.

The molten glass flows from the cooling section into the equalizing section of the forehearth. The equalizing section serves to reheat the molten glass, particularly the outer surface, in the event it is too cool after leaving the cooling section. The equalizing section typically only uses heating provided by heating means such as burners disposed within the walls of that section of the forehearth. The temperature in the equalizing section is controlled independently of the temperature of the cooling section.

Traditional systems for heating glass in a forehearth system use combustion burners of a premix design in which the fuel, for example natural gas, and combustion air are premixed together in the correct stoichiometric ratio before they enter the burner. For example, U. S. Pat. No. 5,169,424 shows generally a forehearth structure in which gas-air burners provide heat to the molten glass flowing through the forehearth. U.S. Pat. No. 4,662,927 shows generally a glass distribution channel in which fuel/air burners provide a flame for heating the space above the flowing molten glass. U.S. Pat. No. 4,708728 is directed to the use of premixed fuel-air burners for heating a glass distribution channel in which the burner has a capillary tube disposed coaxially therein and extending beyond the end of the burner for feeding oxidant into the fuel-air mixture.

However, the use of premixed air-fuel burners for glass distribution systems such as channels and forehearths is not totally satisfactory. Such burners provide very poor fuel efficiency and due to the high volume of combustion gasses, the associated emissions are very high. Further, the day-to-night changes in combustion air temperature causes fluctuations in overall flame temperature. Thus the process temperature may vary with the time of day or night. Most forehearth systems require precise temperature control of the glass, as small as 1° or 2° F. or less, which is difficult to attain with air-fuel burners.

Another disadvantage of the premixed air-fuel firing system is the very limited turndown ratio which, in turn, limits the level of control on the forehearth when responding to a temperature control signal to either increase or decrease fuel input. The turn-down ratio, i.e., the high firing rate of the burner divided by the low firing rate of the burner, for a premix air-fuel burner is only about 4:1 because velocities of the premixed air-gas flame which are too low may result in flashback, while velocities which are too high will blow the flame from the burner nozzle.

To overcome these problems, current practice is to replace the premixed air-fuel burners with 100% oxygen-fuel burners. For example, U.S. Pat. Nos. 5,500,030, 5,405,082, 5,256,058 and 5,199,866 show various arrangements of tube-in-tube design oxy-fuel burners for forehearth applications. However, the use of concentric fuel and oxygen nozzles presents several process and engineering problems for small firing rates.

Tube-in-tube oxy-fuel burners produce a fuel-rich flame core in the center which is surrounded by an annular oxygen flow. The fuel rich center core is allowed to mix with the outer oxygen stream very gradually. The delayed mixing between the co-flowing fuel and oxygen causes some of the fuel (natural gas) to crack or disassociate into soot particles. This soot rich fuel is later combusted with the oxygen to produce a very luminous flame. Most forehearth applications require a non-luminous flame which has minimum visible radiation to minimize any flame signature on the load. A luminous flame of distinct visible radiation can cause uneven heating and undesirable temperature gradients in the molten glass. The objective of the forehearth burner flame is to simply provide hot flame gases from non-luminous flame which are capable of providing a uniform heat flux of ultra violet and infrared wavelengths to the forehearth superstructure. Irradiation of this heat back to the molten glass provides for indirect uniform heating and not direct flame-to-glass heating done with the luminous flame. Uniform heating is necessary to provide the homogeneity in the molten glass bath, which results in a final glass product of good quality.

Additionally, the tube-in-tube design which utilizes a simple center hole for the natural gas nozzle and an annular passage for the oxygen nozzle provides a very long flame. From a forehearth design point, long flames are undesirable. Forehearths are relatively narrow channels. It is difficult to fire a burner with a very long flame length without impingement upon the opposite refractory wall or structure and possible damage thereto. Also, depending upon the design of the forehearth, long flames could eliminate the possibility of installing a burner at a corresponding location on the opposite side wall.

One option to overcome these problems is to design a burner with very high fuel and oxidant velocities to increase mixing and reduce flame length. However, this approach has practical limitations. The drilling of a smaller hole for the fuel nozzle to increase velocity could result in plugging due to soot particles or other particulate matter. The annular passage for the oxygen can not be practically reduced much smaller without causing problems in concentricity in the fuel and oxygen nozzles. A plugged fuel nozzle or misaligned or non-uniform annular oxygen passage can create an unstable flame of fluctuating heat-flux thus affecting the heating process and final product quality.

Moreover, the drilling of a smaller hole such as by laser drilling and using machined surfaces to create a very small annular passage, will result in a relatively high manufacturing cost for a burner. A large quantity of burners is needed in many forehearth applications and high manufacturing costs for a burner would make them prohibitively expensive for use in such applications. From an economics standpoint, a simple burner which is relatively inexpensive and which has the ability to generate a short, non-luminous flame is necessary for widespread use in forehearth applications.

SUMMARY OF THE INVENTION

In view of the above, it is an object of the present invention to provide an improved low firing rate oxy-fuel burner.

Another object of the present invention is to provide an improved low firing rate oxy-fuel burner for use in low firing rate applications such as small reactors, retorts, crucibles, furnaces, forehearths, and refiners.

Yet another object of the present invention is to provide a low firing rate oxy-fuel burner for use with molten glass distribution systems.

Still another object of the present invention is to provide a low firing rate oxy-fuel burner that is simple in design.

A further object of the present invention is to provide a low firing rate oxy-fuel burner which is relatively inexpensive to manufacture.

A still further object of the present invention is to provide a low firing rate oxy-fuel burner for use with molten glass distribution systems which will provide hot flame gases from a non-luminous flame.

Yet still another object of the present invention is to provide a low firing rate oxy-fuel burner for use with molten glass distribution systems which is capable of producing a uniform heat flux within the distribution system.

These and other objects and advantages of the present invention may be achieved according to one aspect of the present invention through the provision of an oxy-fuel burner which comprises a first conduit for the passage of an oxidant, a second conduit positioned within said first tube for the passage of a fuel, an oxidant nozzle attached to the forward end of said first conduit, a fuel nozzle attached to the forward end of said second conduit, and a fuel swirler for said fuel mounted within said fuel nozzle. The fuel swirler includes an elongated member which is aerodynamically centered within said fuel nozzle by the fuel within said fuel nozzle.

In accordance with another aspect of the present invention, there is provided an oxy-fuel burner which comprises a T-member including a cross-bar portion with an inlet and an outlet and a stem portion with an inlet, a first conduit for the passage of an oxidant attached to an outlet of said cross-bar portion of said T-member, a second conduit positioned within said first conduit for the passage of a fuel, and extending though said cross-bar portion of said T-member, an oxidant nozzle attached to the forward end of said first conduit, a fuel nozzle attached to the forward end of said second conduit and positioned within said oxidant nozzle, a coupling for attaching an oxidant line attached to said inlet of said T-member, and a coupling for attaching a fuel line attached to the end of said second conduit which extends from said inlet of said cross-bar portion of said T-member.

The present invention may be better understood by reference to the following detailed description and to the accompanying drawings in which:

DETAILED DESCRIPTION

Figure 1:
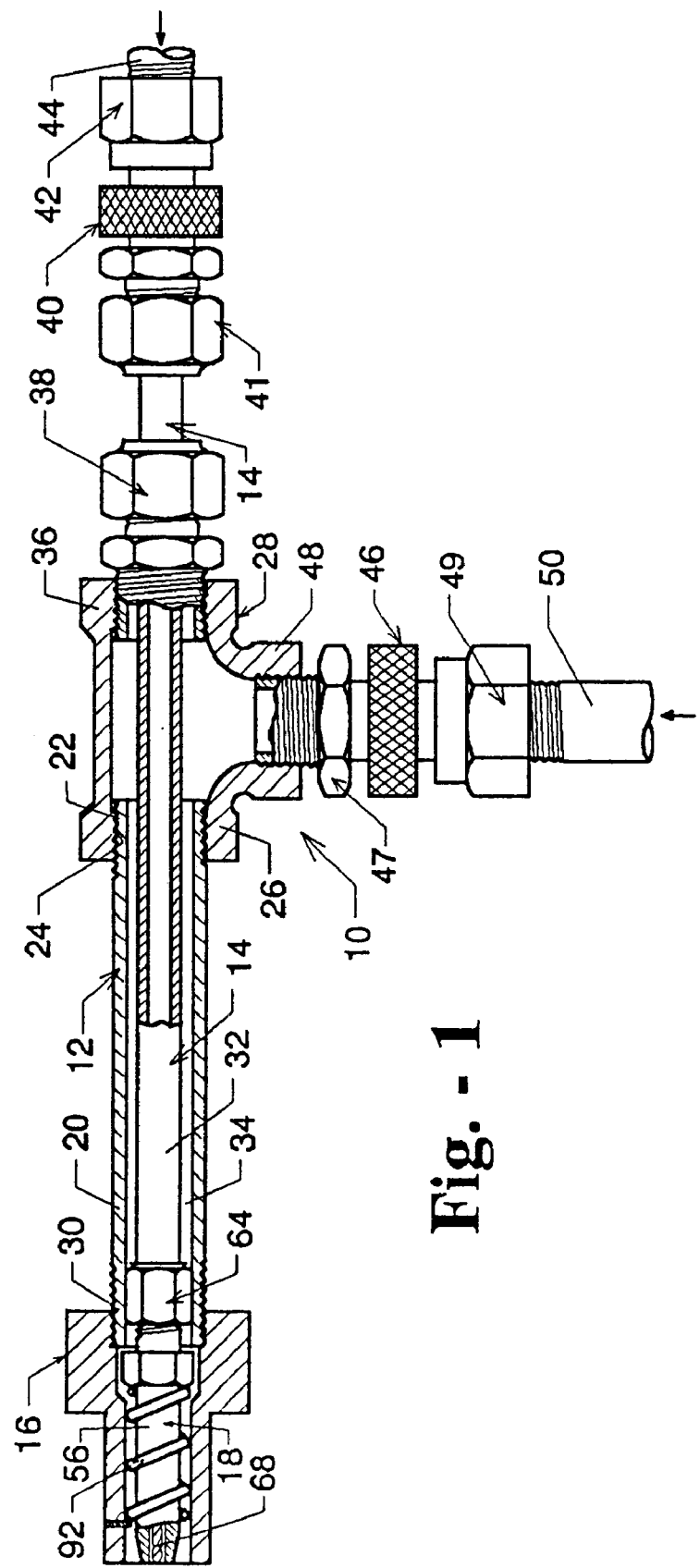
FIG. 1 is a side view, partially in section, of an oxy-fuel burner constructed in accordance with the present invention.
Figure 2:
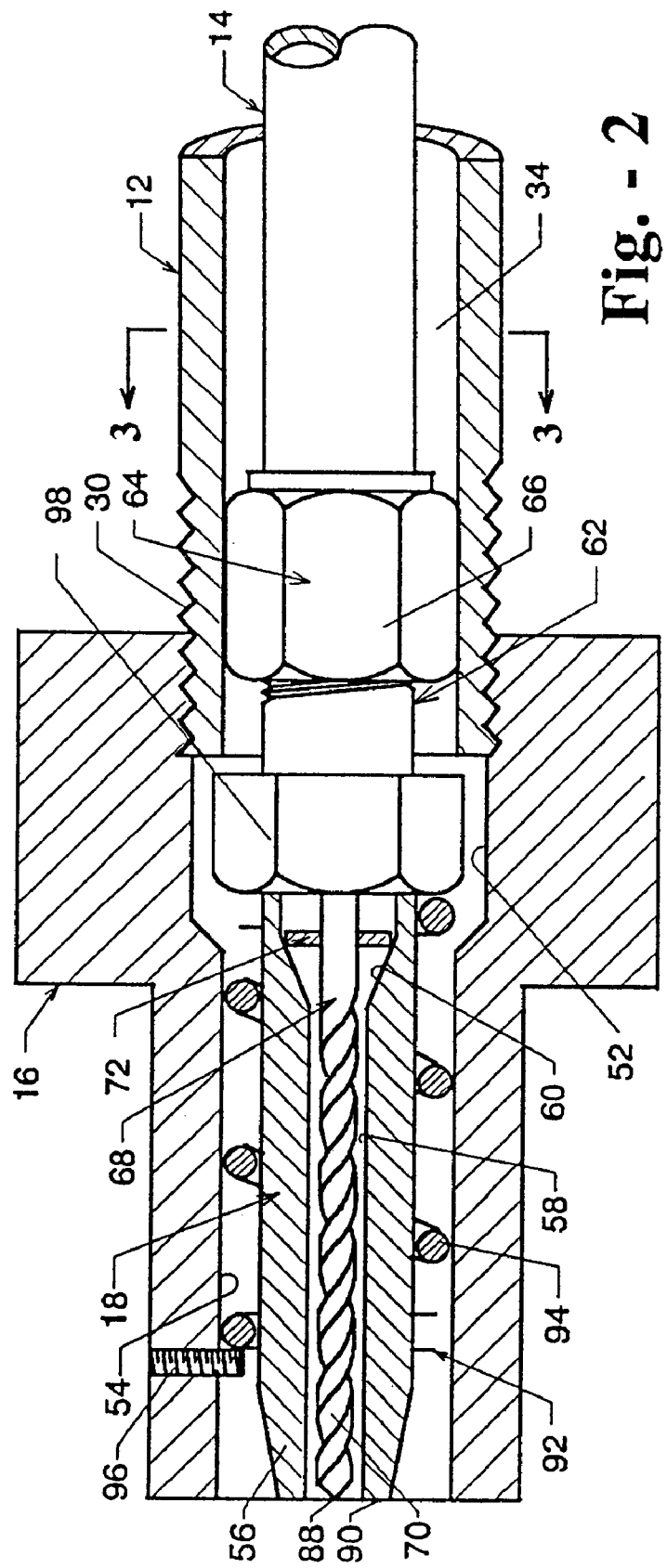
FIG. 2 is an enlarged, partial sectional view, of the forward end of the burner of FIG. 1.

Referring to the drawings, and particularly FIG. 1, the oxy-fuel burner 10 of the present invention includes generally an oxidant conduit 12 and a fuel conduit 14 concentric with and inside of the oxidant conduit 12. The forward end of the oxidant conduit 12 is provided with an oxidant tip or nozzle 16 through which the oxidant exits. The forward end of the fuel conduit 14 is provided with a fuel tip or nozzle 18 through which the fuel exits.

More specifically, the oxidant conduit 12 includes a tubular pipe 20, preferably commercially available, stainless steel pipe, having an outer threaded rearward end portion 22 which is threadedly received within a threaded bore 24 in the outlet 26 at one end of the cross-bar portion of a T-member 28. The T-member 28 is preferably a standard, commercially available, female pipe tee. As an alternative design, the T-member 28 can be a standard, commercially available, female weld tee and the oxidant conduit 12 can be a straight pipe without threads at its rearward end portion. The forward end 30 of the oxidant conduit 12 is externally threaded to which the oxidant tip or nozzle 16 is threadedly connected. This thread can be pipe thread or machine thread.

The fuel conduit 14 includes an elongated tubular member 32 positioned coaxially within the tubular oxidant conduit 12. The fuel conduit 14 is preferably stainless steel tubing and has an external diameter less than the internal diameter of the oxidant conduit 12 to provide an axially extending annular oxidant passageway 34 between the fuel conduit 14 and the oxidant conduit 12 through which the oxidant flows.

The fuel conduit 14 extends through the T-member 28 and exits an inlet 36 of the cross-bar portion of the T-member 26.

A bored-through compression fitting 38 surrounds the fuel conduit 12 and is threaded into the internally threaded inlet 36 of the cross-bar portion of the T-member 28. The compression fitting 38 provides a tight compression seal about the outer periphery of the fuel conduit 14 so that the area between the outer periphery of the fuel conduit 14 and the inlet 36 of the T-member 28 is sealed, thereby effectively sealing the inlet 36 of the T-member 28 against the atmosphere. Alternatively, a bored-through weld compression fitting may be used as the fitting 38 and the connection between the fitting 38 and the T-member 28 may be welded.

The rearward end of the fuel conduit 14 which projects from the inlet 36 of the cross-bar portion of the T-member 28 is provided with a quick disconnect 40. One member of the quick disconnect is connected to the fuel conduit 14 by means of a tube compression fitting 41. The other member 42 of the quick disconnect is threadedly connected to a fuel line 44. When connected, the quick disconnect 40 serves to attach the fuel line 44 to the burner 10. The fuel line 44 is attached to a suitable source (not shown) of fuel.

A quick disconnect 46 includes a first member 47 which is threaded into the threaded inlet 48 of the stem portion of the T-member 28 as shown in FIG. 1. Alternatively, a weld quick disconnect may be welded to the weld tee. A second member 49 of the quick disconnect 46 is threadedly attached to an oxidant line 50. The other end of the oxidant line is attached to a suitable source (not shown) of oxidant. When the two members 47 and 49 of the quick disconnect 46 are connected, the quick disconnect 46 serves to attach the oxidant line 50 to the burner 10. Both of the quick disconnects 40 and 46 are preferably standard, commercially available, stainless steel quick disconnects.

The oxidant tip or nozzle 16 includes an internally threaded counter-bore 52 which is threaded onto the externally threaded forward end 30 of the oxidant conduit 12. A reduced bore 54 is provided in the forward end of the oxidant tip or nozzle 16, coaxial with, and communicating with, the enlarged counter-bore 52, and of lesser internal diameter than the counter-bore 52. Preferably, the oxidant tip or nozzle 16 constitutes a standard, commercially available, male-to-female adapter which has the shape described above. The counter-bore 52 of the oxidant tip or nozzle 16 can be provided with either pipe threads or machine threads to engage with the similarly threaded forward end 30 of the oxidant conduit 12.

The fuel tip or nozzle 18 comprises an elongated nozzle member 56 attached to the forward end of the fuel conduit 14 and concentrically positioned in the reduced bore 54 of the oxidant tip or nozzle 16. The elongated nozzle member 56 has an axial bore 58 of circular cross section extending therethrough with the rearward end portion of the bore 58 being flared outward to provide a tapered surface 60 which defines a frustum of a cone. The fuel tip or nozzle 18 is preferably a standard, commercially available, stainless steel, high pressure adapter with tube compression fitting 62 for attachment to the forward end of the fuel conduit 14. Such standard high pressure adapter includes the elongated nozzle member 56 with bore 58 and tapered surface 60 and compression fitting 62.

Figure 3:
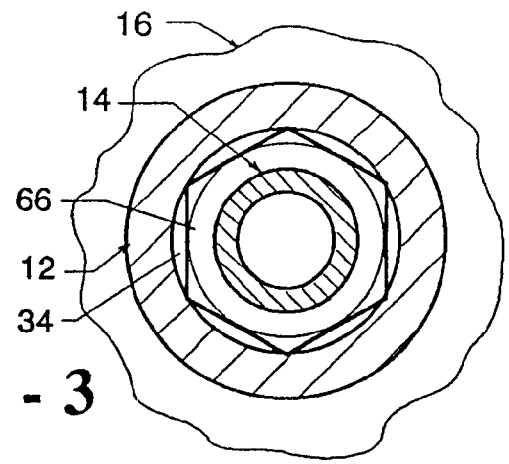
FIG. 3 is a sectional view taken along the lines 3—3 of FIG. 2.

A centering member 64 for the fuel conduit 14 is provided at the forward end of the fuel conduit 14 within the oxidant conduit 12. The centering member 64 is preferably a hex nut 66 which is a component of the compression fitting 62 used to attach the fuel tip or nozzle 18 to the fuel conduit 14. The centering member 64 has a maximum diameter slightly less than the internal diameter of the oxidant conduit 12 so that it can fit within the oxidant conduit 12 but still provide the support to maintain the fuel conduit 14 in co-axial alignment with the oxidant conduit 12. The centering member 64 must provide for a continuation of the axial passageway 34 for the passage of the oxidant. As shown in FIG. 3, the provision of the hex nut 66 inherently provides such a passageway 34 because of its cross-sectional shape.

A fuel swirler 68, for imparting a swirling motion to the fuel is positioned in the bore 58 of the fuel tip or nozzle 18. The fuel swirler 68 has an aerodynamic shape so that it is fluid dynamically suspended within the bore 58 and becomes self-centering as the fuel flows along the fuel swirler 68 through the bore 58. The fuel swirler 68 is in the form of an elongated member which is provided with at least one axial extending helical groove or channel 70 to impart a rotational movement to the fuel as it passes axially through the bore 64 along the fuel swirler 66 and exits the fuel tip or nozzle 18. A retainer 72 at the rearward end of the fuel swirler 68 engages the tapered surface 60 of the bore 58 and restrains the fuel swirler 68 against forward axial movement.

Figure 4:
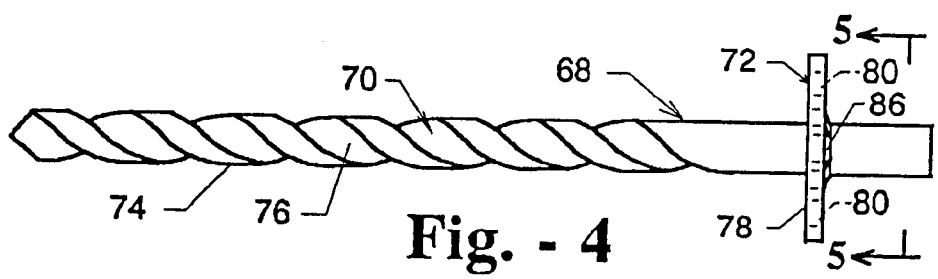
FIG. 4 is an enlarged elevational view of the fuel swirler for the fuel which is positioned in the front end of the burner of FIG. 1.
Figure 5:
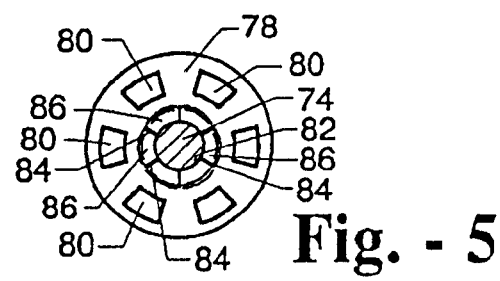
FIG. 5 is a sectional view taken along the lines 5—5 of FIG. 4.

As shown particularly in FIGS. 4 and 5, the fuel swirler 68 preferably comprises a standard twist drill 74 of a predetermined diameter which is less than the diameter of the bore 58 of the fuel tip or nozzle 18. The helical groove or channel 70 of the fuel swirler 68 is provided by the conventional helical flute or flutes 76 of the twist drill 74 which cause the fuel to twist around the drill in a swirling motion as the fuel travels axially through the bore 58 along the twist drill 74.

The retainer 72 is preferably in the form of a standard retainer washer 78 having annular spaced flow apertures 80 therethrough to permit passage of the fuel. The retainer washer 78 has a central bore 82 through which the twist drill 74 extends. A plurality of radially extending, annular spaced slits 84 may extend radially outwardly from the bore 82 to permit the area around the central bore 82 to spring outwardly when the retainer washer 78 is inserted onto the drill 74 to form spring fingers 86 to grip the drill 74. A shallow circular groove (not shown) may be provided around the periphery of the twist drill 74 into which the free ends of the spring fingers 86 may extend when the retainer washer 78 is mounted on the twist drill 72.

The twist drill 74, with the retainer washer 78 attached, is positioned within the bore 58 in the fuel tip or nozzle 18, with the forward surface of the retainer washer 78 being positioned against the tapered surface 60 of the bore 58. The retainer washer 78 is mounted on the twist drill 74 at a point rearward of the rearward end of the flute or flutes 76 and is positioned lengthwise along the twist drill 74 so that, when the twist drill 74 is assembled within the fuel tip or nozzle 18 with the retainer washer 78 positioned against the tapered surface 60 of the bore 58, the forward tip 88 of the twist drill is retained in a position flush with the plane of the forward end 90 of the fuel tip or nozzle 18.

An oxidant swirler 92 for imparting a swirling motion to the oxidant is provided within the oxidant tip or nozzle 16 at the forward end of the oxidant conduit 12. The oxidant swirler 92 preferably comprises a conventional helical spring member 94 of the required wire diameter and a predetermined number of helical turns. The helical spring member 94 is mounted in the bore 54 of the oxidant tip or nozzle 16 and surrounds the fuel tip or nozzle 18. The wire diameter of the helical spring member 94 should be such that it is substantially equal to the distance between the wall of the bore 54 in the oxidant tip or nozzle 16 and the outer surface of the elongated member 56 of the fuel tip or nozzle 18 to prevent the oxidant from flowing straight through the oxidant tip or nozzle 16 without the proper rotational motion being imparted to the oxidant flow. A set screw 96 is threaded into the oxidant tip or nozzle 16 adjacent the forward end thereof and extends into the bore 54 of the oxidant tip or nozzle 16. The set screw 96 provides a forward stop for the helical spring 92. The rearward end of the helical spring abuts against the enlarged hex portion 98 of the fuel tip or nozzle 18.

In operation, the fuel line 44 is connected to a suitable source of fuel. The fuel may be a suitable gaseous hydrocarbon such as natural gas, methane or propane. The source of fuel may be a suitable storage container or the fuel line may be connected directly to an incoming pipe line or fuel manifold.

The oxidant line 50 is connected to a suitable source of oxidant. The oxidant may be any suitable oxidizer containing between 21% and 100% oxygen. Accordingly, as used herein, the term ″oxy″ or ″oxidant″ is taken to mean any gaseous oxidant having at least 21% oxygen. One source of oxidant is preferably commercial grade oxidant which is available on site and stored in suitable containers. The oxidant may also be supplied from other sources such as commercial oxygen diluted with air.

The fuel line 44 from the source of fuel is connected to the burner 10 through the quick disconnect 40. The oxidant line 50 from the source of oxidant is connected to the burner 10 through the quick disconnect 46.

The gaseous fuel flows from line 44 into the burner 10 and through the fuel conduit 14 to the fuel nozzle or tip 16 where it exits the burner 10. The fuel swirler 68 imparts a rotational or swirling motion to the fuel as it exits the tip 16. As the weight of the fuel swirler 68, especially in the form of the twist drill 74, is small compared with the aerodynamic lift forces created by the fuel stream flowing through its helical passages 76, the fuel swirler 68 is dynamically suspended in the gaseous fuel flow and is centered within the bore 64.

The fuel swirler 68 also serves to reduce the size of the fuel nozzle orifice, thereby increasing the fuel velocity at low firing rates. Thus, a high-velocity fuel flow is created at relatively low cost, without the need for relatively expensive laser drilling or machining manufacturing methods which would be required to create a very small orifice in the nozzle itself. Further, the use of a small orifice in the nozzle is subject to plugging by soot or particulate. The fuel nozzle or tip 18 and fuel swirler 68 as described herein can be manufactured at low cost and substantially reduces the possibility of plugging by soot or particulate.

The oxidant flows from the line 50 into the T-member 28 and then through the oxidant conduit 12 in the passageway 34 between the interior wall of the oxidant conduit 12 and exterior wall of the fuel conduit 14. The oxidant passes through the oxidant tip or nozzle 16 and exits the burner 10. As the oxidant passes through the oxidant tip or nozzle 16, the oxidant swirler 92, in the form of the helical spring 94, imparts a rotational or swirling movement to the oxidant as it leaves the forward tip of the burner 10. The swirling jet of fuel mixes with the outer core of swirling oxidant and creates a well-stirred condition for rapid combustion. When a longer flame is desired, the burner 10 can be operated without the oxidant swirler 92. Without the oxidant swirler 92, the burner 10, will produce a longer flame due to less intense mixing.

The burner 10 of the present invention as described above can be made from standard, commercially available, stock components. The T-member 28 can be a standard commercially available pipe fitting or weld fitting. The fuel conduit 14 can be a standard stainless steel tubing having a diameter of ¼″, ⅜″, ½″, ⅝″ or ¾″. The oxidant conduit 12 preferably can be standard stainless steel pipe, schedule 30 or 40, and having a nominal diameter such as ¼″, ⅜″, ¾″, 1″ or 1¼″. The oxidant tip or nozzle 16 can be a standard male-to-female adapter and the fuel tip or nozzle 18 can be a standard high pressure adapter with tube compression fitting. The compression fitting 38 used to seal the T-member 28 can be a standard bored-through compression fitting which is readily commercially available and the quick disconnects 40 and 46 may also be commercially available stock items. The use of a standard twist drill 74 for the fuel swirler 70 and a standard commercially available helical spring 94 for the oxidant swirler 92 also makes use of readily available items. As a result, no welding or machining of any of the burner components is necessary resulting in a cost effective burner design. However, if manufacturing cost is less important, the connections between the T-member 28 and the compression fitting 38 and the quick connect 46 may be welded. Even if these connections are welded, the connection of the oxidant tip or nozzle 16 to the oxidant conduit 12 should preferably remain threaded, and the connection between the fuel tip or nozzle 18 and the fuel conduit 14 should remain a compression fitting, to provide for the changing of the nozzles 16 and 18 for different flow conditions.

By way of example, a specific burner 10 designed for a firing rate of between 2000 and 12000 Btu/Hr (2 to 12 scfh fuel flow rate and a 4 to 24 scfh oxidant flow rate) may utilize a ¼″ schedule 40 pipe as the oxidant conduit 12 and a ¼″ diameter, 0.035″ wall thickness, tubing for the fuel conduit 14. The high pressure adapter used for the fuel tip or nozzle 18 may be a Swagelok SnoTrik Part #SS-441-A-400 which has a bore diameter of 0.060 inches. The male-to-female adapter used for the oxidant tip or nozzle 16 may be a Swagelok part #SS-8-A. The fuel swirler 68 may be a ³⁄₆₄″ diameter twist drill 74. The diameters of the twist drill 74 and the bore 58 in the fuel nozzle 18 create the appropriate annulus for fuel passage so that the proper aerodynamic lift forces are created to perfectly center the twist drill 74 within the bore 58 in the fuel tip or nozzle 16. The oxidant swirler 92 may be a ⁷⁄₁₆″ outer diameter, 0.080″ wire diameter helical spring having a length of ⁵⁄₈₁″.

When a burner 10 as constructed above was fired over a 2 to 12 scfh natural gas firing rate and a 4 to 24 scfh oxidant flow, the burner flame was non-luminous and about 5″ to 7″ long over the firing range. The high momentum oxy-fuel flame color was blue throughout the firing range with little yellow flickers at the low end of the firing range. The burner fuel and oxidant tips remained cool to touch. The natural gas jet was clearly visible with a swirling flow pattern at the tip exit. The axial-tangential natural gas jet immediately mixed with the outer core of swirling oxidant and created well stirred conditions for rapid combustion. The resulting flame thus acquired a blue color in a relatively short length due to complete combustion. The flame was anchored to the twist drill 74, but due to the higher combustion velocities, very little combustion took place at the tip and the drill tip never got too hot. In addition, due to the high axial conduction and convection by the suspended twist drill 74 in the natural gas stream, the fuel tip never accumulated heat over the entire firing range. The twist drill 74 provided flame stability due to active anchoring of the flame at the drill tip. Thus the fluid dynamically centered drill tip acted as a flame stabilizer as well as provided perfect centering to control the natural gas orifice size while offering the necessary swirl generation for non-luminous flame formation.

Although the specific burner described above was designed for firing rates of between 2000 and 12000 Btu/Hr, the burner of the present invention may be used to fire at rates up to 1,000,000 Btu/Hr. Burners used in fiberglass forehearths typically fire at less than 30,000 Btu/Hr, whereas burners used in container glass forehearths may fire up to 100,000 Btu/Hr. In other industrial heating applications, the burner of the present invention may be used to fire at higher firing rates, up to 1,000,000 Btu/Hr.

For designing burners to fire at different firing rates, a design philosophy is to use a "similar velocity" approach for the fuel. Because the fuel flow is complex due to the fuel jet swirl, the actual axial fuel velocity is difficult to calculate. However, a hypothetical axial fuel jet velocity can be calculated by assuming all fuel flow is axial. In the above example the maximum hypothetical axial fuel jet velocity at the fuel nozzle exit is approximately 435 feet per second. This velocity can be used as the maximum hypothetical axial fuel jet velocity in designing burners for firing at higher firing rates. The size of the oxygen nozzle, fuel nozzle, and/or fuel swirler can then be selected so as to increase the volume flow rate of the fuel and oxidant in order to increase the firing rate, while maintaining the fuel flow rate below the described maximum hypothetical axial fuel jet velocity.

The low firing rate oxy-fuel burner 10 of the present invention can be used in many types of industrial heating applications such as small reactors, retorts, crucibles, furnaces, molten glass distribution systems, feeders and refiners. The oxy-fuel burner 10 of the present invention is especially adapted for use in providing heat to a molten glass distribution system such as forehearths, distribution channels and the like.

Figure 6:
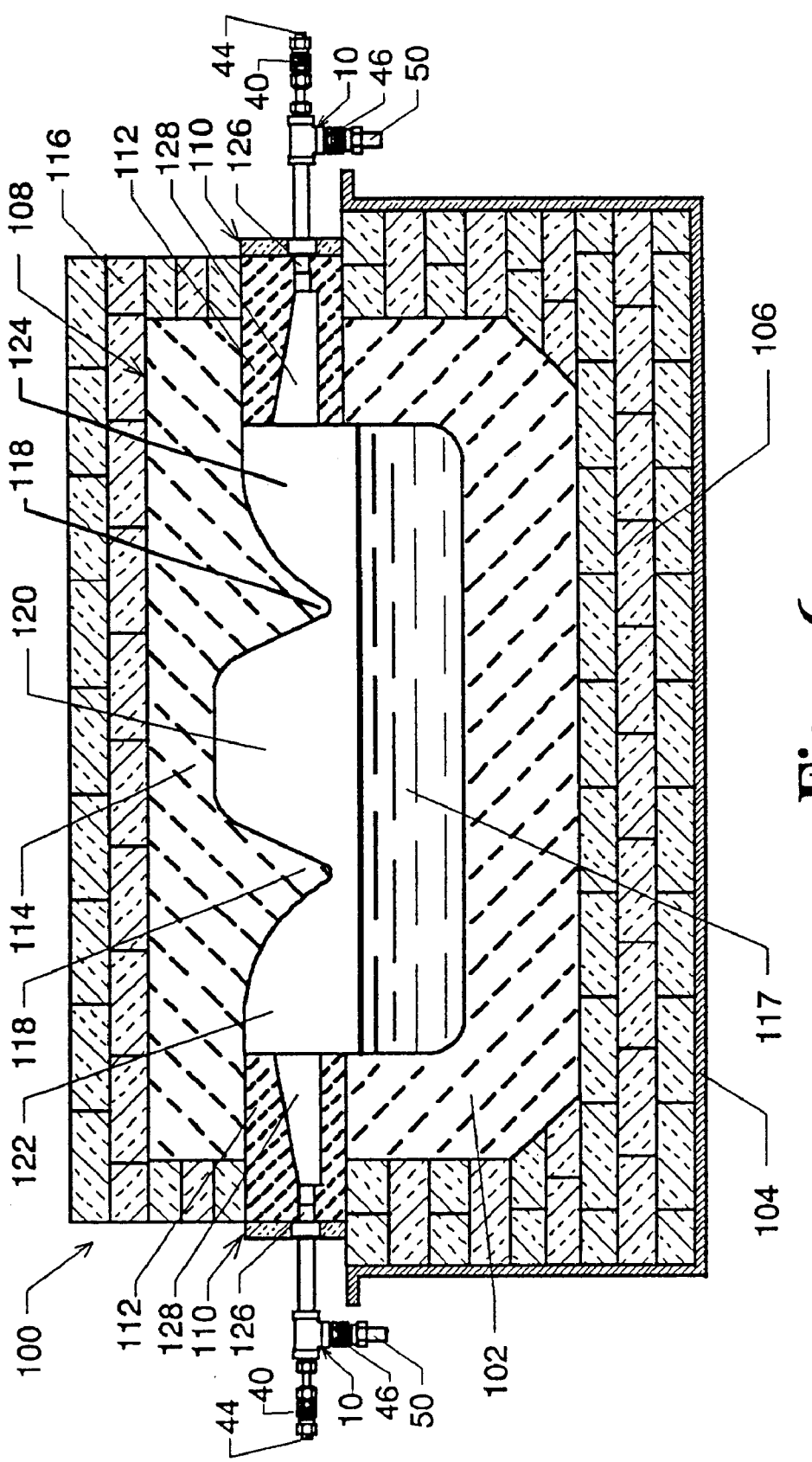
FIG. 6 is a transverse sectional view illustrating a forehearth with which the burner of the present invention may be used.

A typical forehearth 100 with which the burner 10 of the present invention may be used is shown in FIG. 6. The forehearth 100 may include generally a U-shaped channel or trough 102 of refractory material supported by a metallic superstructure 104. The trough 102 sits upon and is surrounded by insulating bricks 106 which are in turn supported by the metallic superstructure 104.

A roof portion 108 covers the channel or trough 102 and includes opposed sides 110 formed by burner blocks 112 and roof blocks 114 extending over the trough between opposed burner blocks 112. Insulating bricks 116 may be provided about the outer periphery of the roof blocks 114. Molten glass 117 flows along the trough 102 as shown. The roof block 114 may include two spaced projections 118 which extend downward toward the molten glass 116 below the centerline of the burner blocks. The spaced projections 118 form a central channel 120 over the central portion of the stream of molten glass 116 and side channels 122 and 124 over respective side portions of the molten glass stream. As is typical in forehearth design, cooling air may be provided along the central channel 120.

The oxy-fuel burners 10 according to the present invention are mounted in the burner blocks 112 with the forward end 126 of each burner extending into an aperture 128 in each burner block 112. The quick disconnects 40 and 46 of each burner 10 are positioned outside its respective burner block 112 to enable the fuel line 44 and oxidant line 50 to be attached thereto. The burners 10 serve to provide a non-luminous flame which extends into the side channels 112 to heat the outer portions of the molten glass stream.

While the invention has been described above with reference to a specific embodiment thereof, it is apparent that many changes, modifications and variations can be made without departing from the concept disclosed herein. Accordingly, it is intended to embrace all such changes, modifications and variations that fall within the spirit and broad scope of the appended claims. All patents referred to above are incorporated herein by reference in their entirety.

What is claimed is:

1. A low firing rate oxy-fuel burner comprising:
   a first conduit for the passage of an oxidant;
   a second conduit positioned within said first conduit for the passage of a fuel;
   a source of fuel in fluid communication with the second conduit;
   an oxidant nozzle attached to the forward end of said first conduit;
   a fuel nozzle attached to the forward end of said second conduit;
   a fuel swirler for said fuel mounted within said fuel nozzle, said swirler including an elongated member, said elongated member being aerodynamically centered within said fuel nozzle by the fuel within said fuel nozzle wherein the distal end of the fuel nozzle has an inner diameter which is larger than the diameter of the elongated member of the fuel swirler; and
   a retainer for restraining the fuel swirler against forward axial movement.

2. The low firing rate oxy-fuel burner of claim 1, wherein said elongated member includes at least one helical flute along a portion of its length.

3. The low firing rate oxy-fuel burner of claim 1 further comprising an oxidant swirler positioned within said oxidant nozzle.

4. The low firing rate oxy-fuel burner of claim 3, wherein said oxidant swirler comprises a helical spring.

* * * * *